Patented May 28, 1940

2,202,057

UNITED STATES PATENT OFFICE 2,202,057

PRODUCING TRANSPARENT COLORS IN LACQUERS

Heinrich Kobbe, Mannheim, Germany, assignor to General Aniline & Film Corporation, a corporation of Delaware No Drawing. Application May 27, 1937, Serial No. 145,053. In Germany June 11, 1936

8 Claims. (Cl. 134—26)

The present invention relates to production of transparent colors in lacquers.

For the coloring of lacquers which have been prepared with the aid of chemical drying binding agents, such as linseed oil, wood oil or condensation products of polyhydric alcohols, polybasic carboxylic acids and drying oils, if desired with an addition of natural or synthetic resins, there have hitherto been used organic dyestuffs soluble in hydrocarbons, as for example, simple azo dyestuffs and anthraquinone compounds. Such dyestuffs are, however, usually not sufficiently fast to light and are as a rule not so stable to heat that the lacquers colored therewith can be dried at elevated temperatures. It has also already been proposed to color lacquers of the said kind by incorporating therewith transparent pigments or color lakes insoluble in organic solvents. This process is very difficult to carry out in practice and frequently does not yield transparent colorations free from objection.

I have now found that lacquers which have been prepared with the use of chemical drying binding agents can be colored transparently in an excellent manner by incorporating therewith solutions of organic dyestuffs which are soluble in organic solvents containing oxygen in solvents of the said kind. The term "organic dyestuffs" also includes the salts of acid dyestuffs with organic bases such as cyclohexylamine. The amounts of oxygen-containing solvents necessary for the dissolution of the dyestuffs are relatively small so that by using the process there are obtained without difficulty well-colored transparent lacquers of excellent fastness to light which may also be directly annealed at elevated temperatures.

The process according to this invention may be used both with oil lacquers, as for example those of linseed oil-stand oil, wood oil and a natural or synthetic resin and with pure stand oil lacquers, or with lacquers derived from condensation products of polyhydric alcohols with polybasic carboxylic acids and drying oils. Oxidation accelerators, as for example metal salts of naphthenic acids, of linoleic acid or of abietic acid may be added to the lacquers if desired.

As solvents for the dyestuffs there may be mentioned for example alcohols, in particular monohydric alcohols, as for example butanol or benzyl alcohol, and also the esters of such alcohols with aliphatic monocarboxylic acids, ethers, as for example ethylene glycol mono- and di-ethers, glycol ether esters and glycol mono- and di-esters, as well as mixtures of these solvents with each other. Instead of ethylene glycol derivatives, there may also be used derivatives of glycols of higher molecular weight, such as those of propylene or butylene glycol or the polyglycols. The solvent or solvent mixture best suited for the dyestuff or lake used may be readily ascertained by a simple preliminary experiment.

Dyestuffs soluble in oxygen-containing organic solvents which are suitable for coloring drying lacquers are in particular those dyestuffs which have already been used for dyeing cellulose ester and ether lacquers as well as spirit resin lacquers. There may be mentioned for example the salts of water-insoluble acid dyestuffs containing salt-forming groups with organic bases, such as are described for example in the U. S. Patents Nos. 1,800,299, 1,800,300 and 1,860,036, and also the complex metal compounds of organic dyestuffs, in particular azo dyestuffs, which are soluble in oxygen-containing solvents. The salts prepared from organic dyestuff bases and complex heavy metal compounds of organic dyestuffs containing sulphonic and carboxylic groups may also be used. The salts prepared from phthalocyanine sulphonic acids and organic bases are also especially suitable. Various azines, as for example diphenyl-1.3-naphthylenediamino-8-sulphonic acid + para-aminodiphenylamino-ortho-sulphonic acid which are soluble in the said solvents may also be employed. In this connection see Schultz Farbstofftabellen, VII ed., vol. I, No. 974, and the Color Index, 1924, No. 833.

The colored drying lacquers prepared according to this invention yield valuable transparent coatings which generally speaking have good to very good fastness to light. By reason of their good stability to heat, the lacquers may also be annealed without the good properties of the colors being impaired thereby.

The following examples will further illustrate how the said invention may be carried out in practice but the invention is not restricted to these examples. The parts are by weight.

Example 1

From 5 to 10 parts of the chromium compound of the dyestuff: 4-nitro-2-aminophenyl-6-sulphonic acid→1-phenyl-3-methyl-5-pyrazolone are dissolved in 100 parts of benzyl alcohol and the solution is added to 1000 parts of a mixture of 600 parts of linseed oil-stand oil and 400 parts of lacquer benzine. The lacquer thus prepared yields orange colored transparent coatings on metals, whereby the drying may be carried out at temperatures up to about 100° C. or if desired somewhat higher. If desired 6 parts of a lead-cobalt-manganese naphthenate (cobalt content 1.5 per cent, manganese content 1.5 per cent, lead content 24 per cent) may be added to the colored lacquer. A lacquer treated in this way dries in the ordinary way at ordinary temperature.

Instead of the said dyestuff there may be used the same amount of the complex chromium compounds of the azo dyestuff: 4-nitro-2-aminophenol-6-sulphonic acid→aceto-acetic acid anilide or the azo dyestuff: 4-chlor-2-aminophenol-6-sulphonic acid→1-phenyl-3-methyl-5-pyrazolone. In the former case a brilliant yellow, and in the latter case a reddish orange coating of good properties as regards fastness is obtained.

*Example 2*

From 5 to 10 parts of the salt prepared from dicyclo-hexylamine and the azo dyestuff: 1-aminobenzene-2-sulphonic acid→1-(2'-sulphophenyl)-5-pyrazolone-3-carboxylic acid are dissolved in 100 parts of glycol monoacetate and the solution is added to 1000 parts of a lacquer consisting of 400 parts of a condensation product of 3⅓ molecular proportions of phthalic anhydride with 3 molecular proportions of glycerine and 1 molecular proportion of linseed oil and 600 parts of a mixture of lacquer benzine and oil of turpentine in the ratio of 3:1. The colored lacquer thus obtained may be annealed at temperatures up to 130° C., or if desired still higher, and no discoloration results. It has a very good fastness to light and excellent transparency.

Instead of the above mentioned condensation product, condensation products of other compositions derived from polybasic acids, polyhydric alcohols and monobasic carboxylic acids may be used, and the dyestuff may be the said chromazo dyestuff or may be replaced by a small amount of dyestuffs of the following composition:

| | Dyestuff | Color of lacquer |
|---|---|---|
| 1 | Dicyclohexylamine salt of the azo dyestuff: para-aminoazobenzene → 2-naphthol-6.8-disulphonic acid. | Red. |
| 2 | Salt of copper phthalocyanine trisulphonic acid with stearylamine. | Blue-green. |
| 3 | Dicyclohexylamine salt of the azo dyestuff: aminoazotoluene → 1-naphthol-3.6-disulphonic acid. | Blue-red. |
| 4 | Monocyclohexylamine salt of the dyestuff 1.5-di-para-toluido-anthraquinone disulphonic acid. | Violet. |

*Example 3*

From 5 to 10 parts of a salt prepared from Rhodamine B (Schultz, Farbstofftabellen, 7th edition, No. 864) and the complex chromium compound of the monoazo dyestuff: 4-nitro-2-aminophenol-6-sulphonic acid→acetoacetic acid anilide are dissolved in 100 parts of glycol monoacetate or benzyl alcohol and the resulting solution is added to 1000 parts of one of the lacquers described in Example 2. With the resulting colored lacquer there are obtained transparent red coatings very fast to light which also retain their good transparency after annealing.

By using a salt prepared from Rhodamine B and the complex chromium compound of the azo dyestuff: 6-nitro-2-aminophenol-4-sulphonic acid→1-phenyl-3-methyl-5-pyrazolone instead of the above mentioned salt, blue-red coatings of equally good properties are obtained.

What I claim is:

1. A process of producing transparently colored lacquers which contain as film-forming material a chemically drying binding agent selected from the class consisting of drying oils and condensation products of polyhydric alcohols, polybasic carboxylic acids and drying oils which comprises incorporating therewith solutions of dyestuffs selected from the group consisting of complex metal compounds of azodyestuffs and organic dyestuffs containing sulfonic acid groups which are neutralized by a nitrogen-containing organic base in organic solvents containing oxygen and selected from the class consisting of butanol, benzyl alcohol, the esters thereof with aliphatic monocarboxylic acids, glycol ethers, glycol ether esters and glycol esters, which dyestuffs are insoluble in the lacquers to be dyed.

2. A process of producing transparently colored lacquers which contain as film-forming material a chemically drying binding agent selected from the class consisting of drying oils and condensation products of polyhydric alcohols, polybasic carboxylic acids and drying oils which comprises incorporating therewith solutions of dyestuffs selected from the group consisting of complex metal compounds of azodyestuffs and organic dyestuffs containing sulfonic acid groups which are neutralized by a nitrogen-containing organic base in a glycol ester, which dyestuffs are insoluble in the lacquers to be dyed.

3. A process of producing transparently colored lacquers which contain as film-forming material a chemically drying binding agent selected from the class consisting of drying oils and condensation products of polyhydric alcohols, polybasic carboxylic acids and drying oils which comprises incorporating therewith solutions of dyestuffs selected from the group consisting of complex metal compounds of azodyestuffs and organic dyestuffs containing sulfonic acid groups which are neutralized by a nitrogen-containing organic base in butanol, which dyestuffs are insoluble in the lacquers to be dyed.

4. A process of producing transparently colored lacquers which contain as film-forming material a chemically drying binding agent selected from the class consisting of drying oils and condensation products of polyhydric alcohols, polybasic carboxylic acids and drying oils which comprises incorporating therewith solutions of dyestuffs selected from the group consisting of complex metal compounds of azodyestuffs and organic dyestuffs containing sulfonic acid groups which are neutralized by a nitrogen-containing organic base in benzyl alcohol, which dyestuffs are insoluble in the lacquers to be dyed.

5. A composition of matter comprising a lacquer which contains as film-forming material a chemically drying binding agent selected from the class consisting of drying oils and condensation products of polyhydric alcohols, polybasic carboxylic acids and drying oils and a dyestuff selected from the group consisting of complex metal compounds of azodyestuffs and organic dyestuffs containing sulfonic acid groups which are neutralized by a nitrogen-containing organic base which dyestuff is soluble in organic solvents containing oxygen and selected from the class consisting of butanol, benzyl alcohol, the esters thereof with aliphatic monocarboxylic acids, glycol ethers, glycol ether esters and glycol esters but insoluble in the lacquer of the composition.

6. A composition of matter comprising a lacquer which contains as film-forming material a chemically drying binding agent selected from the class consisting of drying oils and condensation products of polyhydric alcohols, polybasic carboxylic acids and drying oils and a dyestuff selected from the group consisting of complex metal compounds of azodyestuffs and organic dyestuffs containing sulfonic acid groups which are neutralized by a nitrogen-containing organic base which dyestuff is soluble in a glycol ester but insoluble in the lacquer of the composition.

7. A composition of matter comprising a lacquer which contains as film-forming material a chemically drying binding agent selected from the class consisting of drying oils and condensation products of polyhydric alcohols, polybasic carboxylic acids and drying oils and a dyestuff selected from the group consisting of complex metal compounds of azodyestuffs and organic dyestuffs containing sulfonic acid groups which are neutralized by a nitrogen-containing organic base which dyestuff is soluble in butanol but insoluble in the lacquer of the composition.

8. A composition of matter comprising a lacquer which contains as film-forming material a chemically drying binding agent selected from the class consisting of drying oils and condensation products of polyhydric alcohols, polybasic carboxylic acids and drying oils and a dyestuff selected from the group consisting of complex metal compounds of azodyestuffs and organic dyestuffs containing sulfonic acid groups which are neutralized by a nitrogen-containing organic base which dyestuff is soluble in benzyl alcohol but insoluble in the lacquer of the composition.

HEINRICH KOBBE.